J. D. MARVIL.
WHEEL TIRE.
APPLICATION FILED APR. 3, 1909.
999,511.
Patented Aug. 1, 1911.
2 SHEETS—SHEET 1.
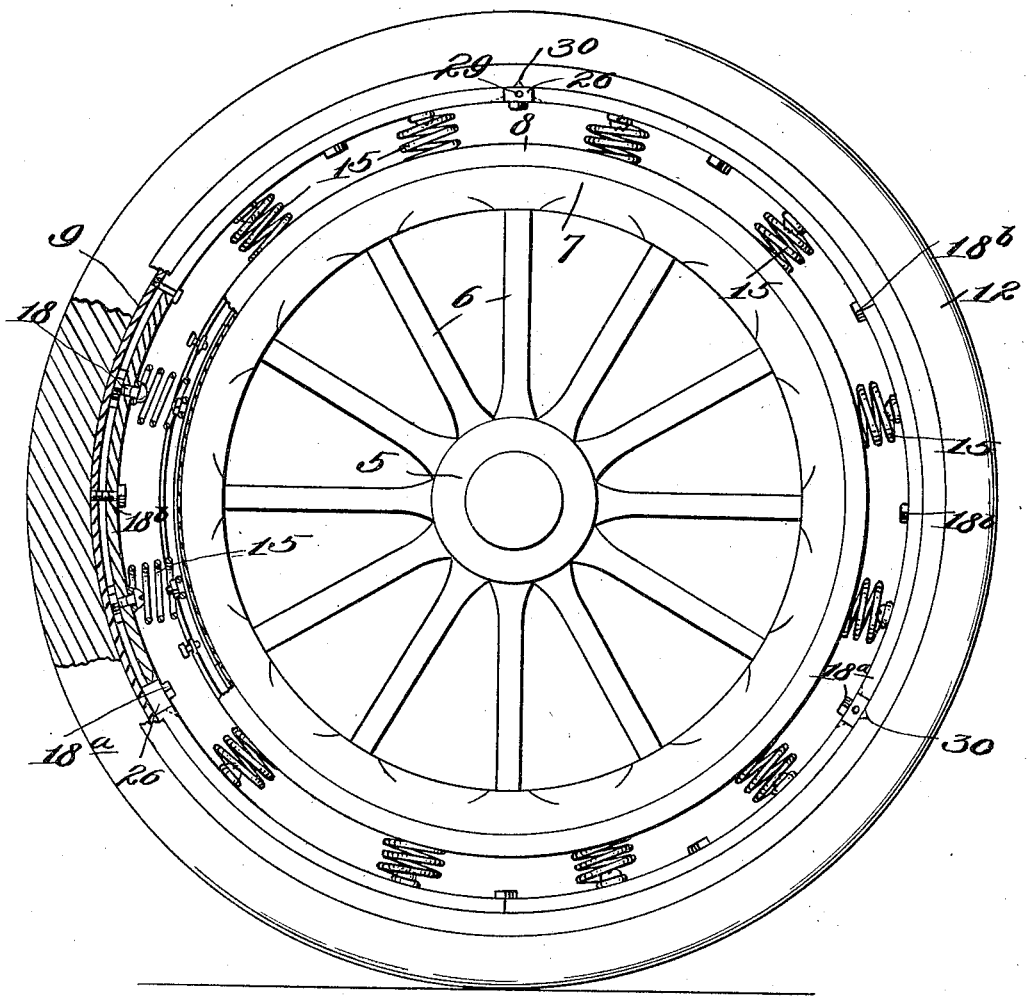
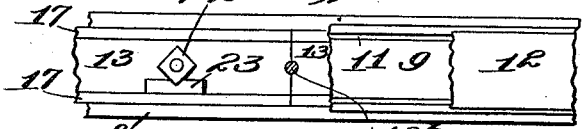

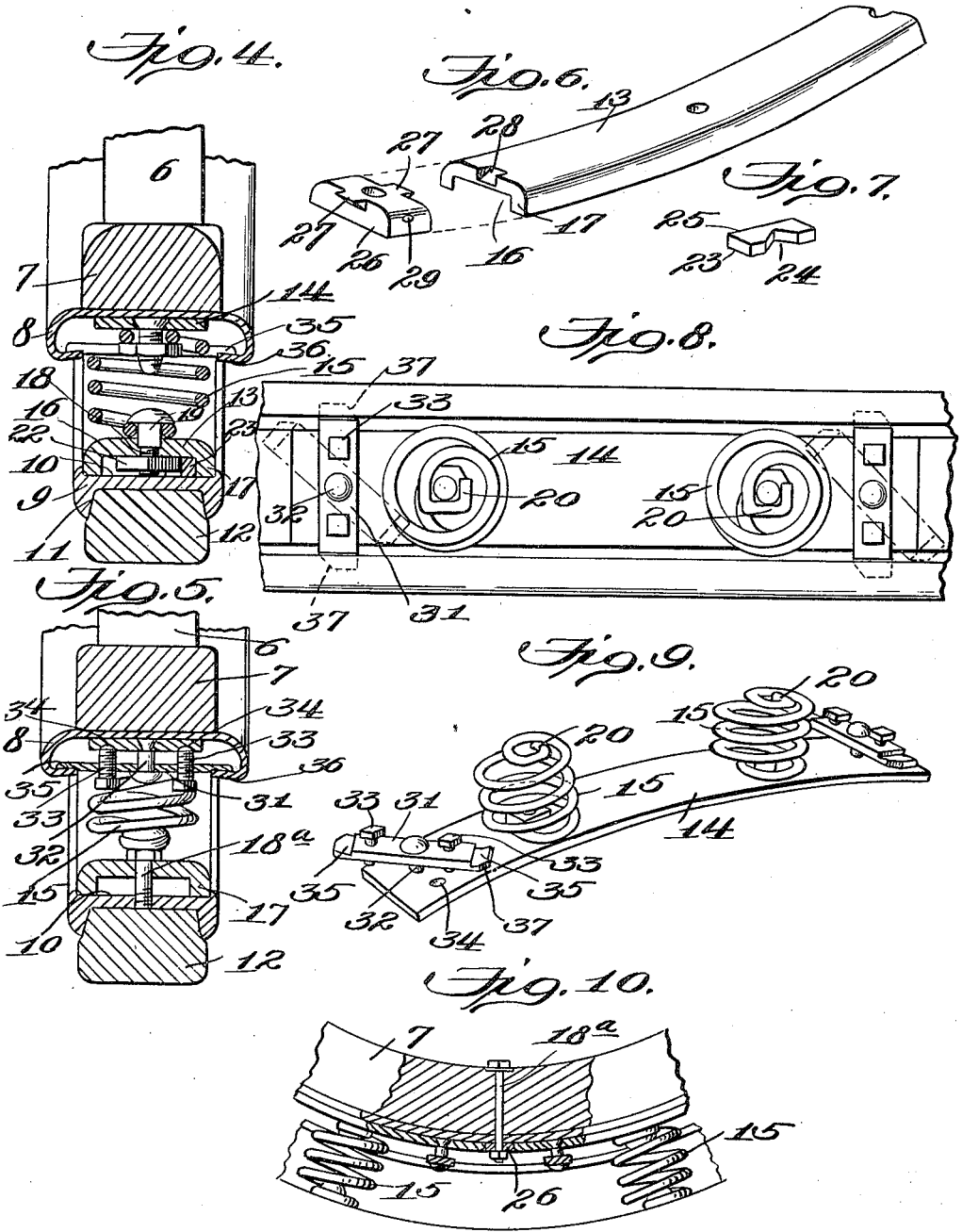

UNITED STATES PATENT OFFICE.

JOSHUA D. MARVIL, OF LAUREL, DELAWARE.

WHEEL-TIRE.

999,511. Specification of Letters Patent. Patented Aug. 1, 1911.

Application filed April 3, 1909. Serial No. 487,692.

*To all whom it may concern:*

Be it known that I, JOSHUA D. MARVIL, a citizen of the United States, residing at Laurel, in the county of Sussex and State of Delaware, have invented new and useful Improvements in Wheel-Tires, of which the following is a specification.

This invention relates to wheels and particularly that class having yielding tires for producing a cushioning effect without utilizing pneumatic means or an inner inflated tube or chamber under pneumatic pressure.

The primary object of the invention is to provide a wheel having a spring organization made in sections which are individually capable of detachment without removing all of the sections or dismantling the complete wheel rim when it is necessary to repair or replace any one of the sections.

A further object of the invention is to provide a wheel having a rim organization embodying spring carrying sections which may be readily applied to wheel rims as now ordinarily constructed without requiring a special construction or arrangement of the rim and avoiding in the preferred application the formation of openings through the rim and whereby it is possible to remove the entire rim organization embodying the features of the invention and replace the same if desired by the usual pneumatic wheel rim structure.

A still further object of the invention is to provide a rim organization for a wheel embodying a plurality of sections carrying springs without weakening any part of the rim organization by forming a practically continuous band means of the sections and thus avoid crushing of any part of the rim organization when the wheel is subjected to unusual service or in traveling over rough roads.

With these and other objects and advantages in view, the invention consists in the construction and arrangement of the several parts which will be more fully hereinafter specified in preferred form, one embodiment of the invention being illustrated in the accompanying drawings for the purpose of demonstrating a practical organization which may be varied within the meaning or scope of the invention.

In the drawings: Figure 1 is a side elevation of a wheel, with parts broken away and shown in section, and illustrating the features of the invention. Fig. 2 is a top plan view of a portion of the wheel tire, with parts broken away. Fig. 3 is a detail perspective view of one of the securing bolts. Fig. 4 is a transverse vertical section through the tire and rim. Fig. 5 is a view similar to Fig. 4 taken through another portion of the tire and rim. Fig. 6 is a detail perspective view of one of the spring carrying sections and a key to coöperate therewith. Fig. 7 is a detail perspective view of a locking means for the securing bolts of the spring carrying sections. Fig. 8 is a top plan view of a portion of the wheel rim particularly showing the means for securing one of the inner spring carrying sections to the wheel rim without requiring mutilation of the latter. Fig. 9 is a detail perspective view of one of the inner spring carrying sections to engage the wheel rim. Fig. 10 is a sectional elevation showing a slight modification in the assemblage of the inner spring carrying sections engaging the wheel rim and particularly illustrating the use of a key between the terminals of the sections.

The numeral 5 designates a hub having a plurality of spokes 6 radiating therefrom and connected to or forming a part of a rim 7, the latter including in its organization the usual channeled retaining means 8 now commonly employed in ordinary wheels equipped with pneumatic tires. The wheel as shown and embodying the parts 5, 6, 7 and 8 is the well known form of device of this class now commonly used on automobiles and like vehicles, and as hereinbefore noted one of the main advantages of the present wheel construction is that no mutilation or particular preparation of the main wheel structure is necessary to apply the improved tire organization except in one specific instance or modified form as shown by Fig. 10 and which will be more fully hereinafter explained.

The improved tire organization comprises an outer continuous metallic band 9 circumscribing the rim of the wheel and standing outwardly from the latter a distance sufficient to render the remaining parts of the rim practically applicable and removable. The band 9, as clearly shown by Figs. 4 and 5, is formed with an inner channel 10 and an outer seat 11 to receive an elastic tread member 12 which is preferably of the form shown but may be varied at will.

The spring carrying means embodies outer and inner companion sections 13 and 14 and may have one or more springs 15 attached thereto, the sections in the wheel shown by Fig. 1 carrying two springs, and the section 13′ as shown by Fig. 6 being arranged to support one spring; and by this mode of illustrating the number of springs that may be carried by the sections it will be understood that it is proposed to use any number of springs in connection with each pair of sections. The outer sections 13 are channeled as at 16, these channels being formed by bending or striking over the opposite side edges 17 which are fitted in the channel 10 of the band 9 and secured by bolts 18 of the form shown by Fig. 3 and having a part 19 of the shanks angular or square in cross-section. The heads of the bolts 18 are located adjacent to the inner surfaces of the sections 13 and the outer surfaces of the sections 14, and the terminals 20 of the springs, as shown by Figs. 8 and 9, are bent at an angle to fit around the angular parts 19 of the bolts to prevent the springs from having rotating movement. The bolts 18 applied to the outer sections 13 have the threaded portions 21 of their shanks engaged by nuts 22 within the channels 16 and the said nuts are prevented from turning by locking blocks or members 23, shown in detail by Fig. 7, and having angular recesses 24, one in each, to receive portions of the nuts, the outer straight walls 25 of these locking blocks or members bearing snugly against the one bent edge or flange 17 of the outer sections 13. These locking blocks or members 23 are not penetrated or held by fastenings and will not slip out of place in view of the fact that they are so proportioned as to fill up the distance between the bent edges or flanges 17 and the adjacent portions of the nuts 22. By this means the bolts 18 are prevented from working loose under vibration and the springs 15 are consequently maintained in positive connection with the outer sections 13. The outer sections 13 continue regularly around the band 9 to which they are applied without terminal gaps, and at regular intervals keys 26 are interposed between the ends of pairs of the outer sections 13, said keys consisting of blocks having opposite dovetail projections or ribs 27 to fit in correspondingly shaped seats 28 in the ends of the sections 13, one of the bolts 18ª being passed through each key to hold it firmly in applied position. The sections 13 are fitted against the band 9 and the keys 26 are afterward inserted, and when it is desired to remove anyone of the sections the key coöperating with the section desired to be removed is detached, thus permitting a freedom of action or sufficient looseness of the section thus affected to permit it to be drawn out of the channel 10 of the band 9. It is also proposed in some instances to similarly connect the ends of the inner spring carrying sections 14, as shown by Fig. 10, a key 26 constructed as hereinbefore explained being interposed between the ends of the said sections 14 and removably held in place by a bolt 18ª passed through the rim of the wheel, this construction requiring a slight mutilation of the rim or the formation of openings to receive the said bolts 18ª. For reasons hereinafter explained, however, keying of the inner spring carrying sections 14 is not necessary, but it may be preferred in some constructions to key both the outer and inner spring carrying sections 13 and 14.

The bolts used for securing the keys 26 in place demonstrate one practical form of positively attaching said keys in a removable manner, but it will be understood that other means might be adopted for securing these keys, and in the construction shown by Figs. 1, 4 and 5 the bolts 18ª which are inserted through the keys penetrate the band 9, as particularly shown by Fig. 5, without passing entirely through the said band, and are readily removable and applicable by means of a wrench or other suitable implement placed in engagement with the heads thereof. To facilitate the removal of the keys after the bolts 18ª have been released, the one end of each key is formed with an opening 29 and adjacent to this opening the band is notched as at 30 for the purpose of inserting the reduced extremity of an instrument in the opening. The sections 13 and 13′ by the arrangement specified practically form a continuous supplemental band around the inner side of the outer supporting band 9 and the rim organization is thus materially strengthened as all gaps between the ends of the said sections are closed and the sections resist injury or crushing of any part of the band by a sudden pound or blow that might be brought thereon in traveling over rough or stony roads or engaging ruts or other obstructions.

The inner sections 14 are each separably held within the channeled retaining means 8 of the rim 7 and for this purpose are provided with terminal securing means which may be readily operated to rigidly fasten each section within the channeled retaining means or to release the section. One form of fastening means is particularly shown by Figs. 8 and 9 and consists of a turn-bar 31 intermediately engaged by and freely movable on a fulcrum stud 32 secured in the center of the section 14 adjacent to one end of the latter, the bar 31 being movable on this fulcrum stud toward and away from the section 14. Each turning bar also carries two clamping screws 33 individually disposed between the fulcrum stud and the terminals of the bar, and the ends of these clamping screws fit into recesses 34 in the section 14 to prevent the bar 31 from shifting or moving after it has been adjusted through the medium of said clamping screws to secure the section in place within the channeled retaining means 8. The opposite extremities of each bar 31 are recessed as at 35 to fit under and snugly engage the flanges 36 of the retaining means 8, and the reverse corners of each bar are cut away as at 37 to give the bar a clearance in turning the same under the said flanges 36. It will be understood that the sections 13 and 14 carry one or more springs 15 as hereinbefore indicated and said sections are simultaneously applied to and removed from the rim of the wheel. Both sections 13 and 14 serving as the spring carrying means are curved longitudinally in accordance with the curvature of the band 9 and the channeled retaining means 8 and when the companion sections are applied the inner section 14 is first fitted in the channeled retaining means with the bars 31 standing as shown by dotted lines in Fig. 8, and after the section 14 has been seated the said bars are turned as shown by full lines in Fig. 8 and the clamping screws 33 are operated to cause the bars 31 to be forced firmly against the under portions of the flanges 36 with the terminals of the said flanges fitting firmly in the recesses or seats 35 in the opposite ends of the bars. The inner sections 14 are of considerably less width than the distance between the inner opposing edges of the flanges 36 so that they may be readily inserted within the channeled retaining means 8, and when the bars 31 are arranged and secured as shown by full lines in Fig. 8, the pressure on the sections 14 is sufficiently strong to set up a positive engagement of the said sections 14 with the channeled retaining means 8, as shown by Fig. 4, and slipping movement or displacement of the sections 14 is prevented. After the section 14 of each pair of sections 13 and 14 is secured as just specified, the outer coöperating section 13 is forced into place in the channel 10 of the band 9 and the keys 26 introduced at the points explained and the bolts for securing the parts applied. As clearly shown by Figs. 1 and 5, between the springs 15, bolts 18$^b$ are inserted through the outer sections 13 into the band 9, the bolts 18$^b$ being of such length as to terminate flush with the outer surface of the band and do not penetrate the elastic or rubber tread 12. It is preferred that at the conterminous ends of the outer sections 13 between the ends of said sections engaged by the keys 26, the bolts 18$^b$ penetrate the joint, half of the bolt opening being formed in the end of one section and the remaining half of said opening in the end of the adjacent section, the heads of the bolts penetrating these joints extending over far enough to prevent the said ends from working loose.

What is claimed is:

1. A rim for a wheel comprising a plurality of spring carrying sections having contiguous ends engaging each other, the parts of each pair of spring carrying sections being held intact when removed from and applied to the rim and having the springs terminally secured thereto, the pairs of spring carrying sections being individually removable from and applicable to the rim without disturbing the remaining pairs of sections or the coöperating parts of the wheel, a part of the sections having keys interposed between the ends thereof and the remaining part of the sections having turnbars at their ends to separably secure the pairs of spring sections to different portions of the wheel rim.

2. The combination with a channeled wheel rim, of a tire organization comprising a plurality of groups of pairs of spring carrying sections arranged end to end, the said sections having keys interposed between the ends thereof and provided with opposite portions projecting into the section ends, each group of sections being individually applicable to and removable from the rim without disturbing the remaining sections.

3. The combination with a wheel rim, of a continuous band surrounding the rim and spaced therefrom and carrying an elastic tread, a plurality of groups of spring carrying sections applied to the band and continuing regularly around the latter without intervening gaps between their ends, each group embodying an outer and an inner section with springs interposed between the sections, the groups of spring carrying sections being individually removable from and applicable to the rim without disturbing the remaining sections, and interposed keys and turn bars for securing the sections to the rim.

4. The combination with a wheel rim, of a continuous band surrounding the rim and spaced therefrom and carrying an elastic tread, a plurality of groups of spring carrying sections removably applied to the band and continuing regularly around the said band without intervening gaps between their ends the ends of the sections being flat, and removable keys interposed between and having opposite projections extending into the ends of the sections so that the sections may be individually removed and applied, the keys being flush with the ends of the sections.

5. A rim for a wheel comprising a spring cushioning means involving a plurality of groups of spring carrying sections arranged in end to end relation and continuing regularly around the rim without intervening gaps between their ends, the groups of sections being individually removable and applicable without disturbing the remaining sections, keys interposed between and having opposite portions projecting into the ends of the sections and the rim, and an elastic tread device coöperating with the spring cushioning means.

6. The combination with a channeled wheel rim, of a tire organization involving a plurality of groups of spring carrying sections, each group comprising a pair of sections, the inner section of each pair having a fastening device at opposite ends movably held thereon to engage portions of the channeled rim and the outer section of each pair having fastening devices extending through the abutting ends thereof, the pairs of sections being individually applicable to and removable from the rim without disturbing the remaining sections.

7. The combination with a wheel rim, of a continuous band surrounding the rim and spaced therefrom and having an elastic tread, a plurality of groups of spring carrying sections, each group comprising a pair of sections, and all the pairs of sections being independently applicable to and removable from the band and rim, the outer sections of each pair having their ends abutting and continuing regularly around the band, springs held between each pair of sections and provided with locking means to prevent rotation thereof, and means for removably securing the sections to the band and rim.

8. The combination with a wheel rim having a channeled form, of a tire organization comprising a plurality of groups of pairs of inner and outer spring carrying sections independently applicable to and removable from the rim and provided with fastening means for engaging the rim, a portion of the fastening means being interposed between a part of the section ends and secured to the rim and the remaining portion of the fastening means being carried by the section ends and engaging the rim.

In testimony whereof I have hereunto set my hand in presence of two subscribing witnesses.

JOSHUA D. MARVIL.

Witnesses:
 ISAAC H. DOWNS,
 NORMAN L. WARD.

Copies of this patent may be obtained for five cents each, by addressing the "Commissioner of Patents, Washington, D. C."